United States Patent Office 2,773,864
Patented Dec. 11, 1956

2,773,864

COUPLING ASSISTANTS FOR POLYAZO DYES

William W. Williams and Ludwig Richter, Easton, Pa., assignors to General Aniline & Film Corporation, New York, N. Y., a corporation of Delaware No Drawing. Application April 19, 1952,
Serial No. 283,243

9 Claims. (Cl. 260—181)

This invention relates to a process for the production of polyazo dyes and particularly to the provision of a coupling assistant to improve the yield of the polyazo dye.

It is well known in the azo dye art that the production of polyazo dyes by the coupling of diazo azo compounds and coupling components often does not proceed smoothly to maximum yield without the introduction of coupling assistants to prevent side reactions causing contamination of the product as well as diminution in yield. Maximum practical yields are generally considerably less than theoretical.

Pyridine has been used widely as a coupling assistant in the production of polyazo dyes. Its exact method of acting, whether as a catalyst, as a solvent or assistant, is not known, but many coupling reactions are carried out with greater ease, and higher yields are obtained in its presence than otherwise. Large amounts of the pyridine assistant are generally employed. Typically, in the process of U. S. Patent 2,476,261, an amount of pyridine equal to 25% of the coupling mixture is employed in the coupling reaction in order to produce a purer product and better yields of the polyazo dyes of that patent than can be produced without the aid of the pyridine.

It has now been discovered that greatly improved results can be obtained over and above the results obtained when pyridine is used if the pyridine is replaced by 5-ethyl-2-picoline, i. e., 2-methyl-5-ethyl pyridine. An increase in yield up to 25% over the yield obtainable by using pyridine is obtained when using 2-methyl-5-ethyl pyridine. It is also possible to produce such results with smaller amounts of 2-methyl-5-ethyl pyridine than of pyridine. For example, optimum amounts of 2-methyl-5-ethyl pyridine are generally less than 10% of the coupling solution in which the polyazo dye is being formed from the diazo azo compound and the coupling component. In some instances, amounts equal to 1% of the coupling solution are of material benefit.

5-ethyl-2-methyl pyridine is less volatile than pyridine and correspondingly less odorous. Its use in accordance with this invention instead of pyridine produces lower concentrations of noxious vapors in the vicinity of the equipment employed and is therefore less objectionable from the standpoint of health and comfort of personnel.

This process for the improvement of the coupling reaction is applicable to all polyazo dyes other than the azoic or "ice color" dyes, i. e., insoluble azo dyes formed by coupling on the fabric by ageing or similar developing procedure. Obviously, the production of a polyazo dye in which pyridine or 2-methyl-5-ethyl pyridine is used as the coupling assistant is not limited to any specific class of polyazo dyes. However, it is particularly applicable to the production of polyazo dyes which contain as middle components 2-alkoxy-(especially methoxy or ethoxy) 1-naphthylamines or their sulfo derivatives, especially 1-amino-2-ethoxy naphthalene-6-sulfonic acid or 1-amino-2-naphthol ethyl ether.

The following example, in which the parts are by weight, will serve to further illustrate the invention, it being understood that the components, proportions and conditions employed therein are illustrations and not limitations.

*Example*

223 parts (1 mole) of 2-aminonaphthalene-8-sulfonic acid is diazotized and coupled in the usual manner with 187 parts (1 mole) of 2-ethoxy-1-naphthylamine. The resulting coupling solution is then adjusted to a temperature of about 18° to 20° C. and to a pH of about 9.5 with caustic soda; and 700 parts of 66° Bé. sulfuric acid are added, followed by 160 parts 31.5% aqueous NaNO₂ solution. After about 2 hours, the resulting diazo azo compound is filtered out, washed with cold water and made into a smooth slurry with ice.

A coupling solution is made up containing 250 parts 1,8-dihydroxy-naphthalene-4-sulfonic acid dissolved in 3000 parts water at 90° C., the pH being adjusted to about 7.5 with sodium bicarbonate, and the solution cooled to 0° C. with floating ice. 240 parts of 2-methyl-5-ethyl pyridine are added to this coupling solution, followed by addition of the diazo azo compound prepared as above. The temperature of this coupling mixture is maintained at 0° C. for about 1 hour and then is gradually allowed to rise with stirring. The mix is then diluted with water to about 16,000 parts at 60° C., salted out with sodium chloride, filtered, washed and dried.

The resulting polyazo dye, having the formula:

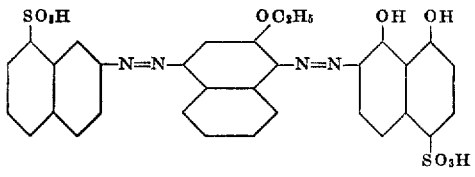

is obtained in a yield about 25% greater than is obtained when pyridine is employed as the coupling assistant in the final coupling of the diazo azo compound and the 1,8-dihydroxy-naphthalene-4-sulfonic acid coupling component.

Polyazo dyes have been prepared by a procedure similar to that of the foregoing example in which diazo azo compounds obtained from the following components

| Diazo Components | Coupling Components |
|---|---|
| p-amino-acetanisidide. | 2-ethoxy-1-naphthylamine. |
| 4-amino-acetanilide-3-sulfonic acid. | 2-ethoxy-1-naphthylamine-6-sulfonic acid. |
| o-amino-benzene sulfonic acid. | 1-naphthylamine-7-sulfonic acid. |
| 2,5-dichloro-sulfanilic acid. | |
| 2-naphthylamine-8-sulfonic acid. | |
| 4-(2',5'-disulfo-benzene azo)-1-naphthylamine. | | as well as the diazo azo compound from equimolecular amounts of tetrazotized benzidine-3,3'-dicarboxylic acid and 1-naphthol-5-sulfonic acid, are coupled with the following components in alkaline aqueous solution containing between 5 and 10% of 2-methyl-5-ethyl pyridine:

Phenyl J acid
p-Anisyl J acid
p-Aminophenyl J acid
p-Aminobenzoyl J acid
p-aminobenzoyl-p-aminobenzoyl H acid In each case, the yield substantially exceeds that obtained when pyridine is substituted for 2-methyl-5-ethyl pyridine.

By reason of the increased yield of the resulting dyestuffs, the yield of higher polyazo dyes produced from those of the disazo compounds which contain diazotizable amino groups (e. g. those containing as an end component p-aminophenyl J acid, p-aminobenzoyl J acid or p-aminobenzoyl-p-aminobenzoyl H acid) by further diazotization and coupling with an additional coupling component such as l-phenyl-3-methyl pyrazolone-5 or β-naphthol, is also increased.

In preparing a polyazo dyestuff by coupling tetrazotized benzidine first with one molecular equivalent of salicylic acid, then with one molecular equivalent of 1-naphthylamine-6-sulfonic acid, rediazotizing and coupling with one mole of 8-hydroxyquinoline, inclusion of 5% to 10% of 2-methyl-5-ethyl pyridine in the final coupling component solution also produces an increased yield as compared with pyridine.

The improved process of this invention is preferably applied in alkaline coupling of naphthol sulfonic acids and amino naphthol sulfonic acids with diazo azo compounds prepared by coupling 2-methoxy- or 2-ethoxy-1-naphthylamine or a sulfonic acid thereof with a diazotized amine which may be one of the following:

Toluidines
Anisidines
Chloranilines
Chlorotoluidines
Chloroanisidines
Aminoacetanilides
Aminoacetanilide sulfonic acids
Naphthylamines
Naphthylamine sulfonic acids
Amino naphthyl sulfonic acids and rediazotizing the resulting amino azo compound. The improvement is also of value, however, in coupling aryl azo biphenyl diazo compounds, obtained from equimolecular proportions of tetrazotized benzidines by coupling with one of the amines of the foregoing list.

The proportion of 2-methyl-5-ethyl pyridine employed in the coupling reaction is suitably at least 1% and preferably 5% to 10% by weight of the aqueous coupling compound solution in which the polyazo dyestuff is formed. Higher concentrations, e. g. up to 25%, can be used, but in general, further increase in yield is comparatively insignificant at concentrations above 10%.

Variations and modifications which will be obvious to those skilled in the art can be made in the procedure of the example without departing from the spirit or scope of the invention.

We claim:

1. In the process of producing polyazo dyes in substance, the step which comprises coupling an aryl diazo azo compound with a coupling component in solution in aqueous alkaline-to-neutral medium, in the presence of 2-methyl-5-ethyl pyridine amounting to 1% to 25% of the coupling component solution.

2. A process as claimed in claim 1, wherein the concentration of 2-methyl-5-ethyl pyridine in the coupling component solution is at least 1% by weight.

3. A process as claimed in claim 1, wherein the concentration of 2-methyl-5-ethyl pyridine in the coupling component solution is from 5% to 10%.

4. In a process for producing a polyazo dye which comprises coupling an aryldiazo compound with an α-naphthylamine compound, rediazotizing and coupling the resulting diazo azo compound with a naphthol sulfonic acid in aqueous alkaline-to-neutral solution, the improvement which consists in including 1% to 25% of 2-methyl-5-ethyl pyridine in the naphthol sulfonic acid solution during the second coupling reaction.

5. A process as defined in claim 4, wherein the α-naphthylamine compound is 1-amino-2-ethoxy-naphthalene.

6. A process as defined in claim 4, wherein the α-naphthylamine compound is 1-amino-2-ethoxy-naphthalene-6-sulfonic acid.

7. In a process for producing a polyazo dyestuff which comprises coupling a tetrazotized 4,4'-diamino-biphenyl compound with an equimolecular quantity of an azo coupling component, and coupling the resulting diazo azo compound with a naphthol sulfonic acid in alkaline-to-neutral aqueous solution, the improvement which consists in including 1% to 25% of 2-methyl-5-ethyl pyridine in the naphthol sulfonic acid solution during the second coupling reaction.

8. A process as defined in claim 7, wherein the tetrazotized 4,4'-diamino-biphenyl compound is tetrazodized benzidine-3,3'-dicarboxylic acid.

9. In a process for preparing a polyazo dyestuff which comprises diazotizing 2-aminonaphthol-8-sulfonic acid, coupling with 1-amino-2-ethoxy-naphthalene, rediazotizing the resulting amino azo compound, and coupling the resulting diazo azo compound with 1,8-dihydroxynaphthalene-4-sulfonic acid in aqueous alkaline-to-neutral solution, the improvement which consists in including 5% to 10% of 2-methyl-5-ethyl pyridine in the second coupling solution during the second coupling reaction.

References Cited in the file of this patent

UNITED STATES PATENTS

| | | |
|---|---|---|
| 1,602,991 | Schweitzer et al. | Oct. 12, 1926 |
| 1,849,573 | Gyr | Mar. 15, 1932 |
| 2,476,261 | Mayer | July 12, 1949 |

OTHER REFERENCES

Farbwerke, Chem. Abs., vol. 14, 1920, p. 3676.

UNITED STATES PATENT OFFICE
CERTIFICATE OF CORRECTION

Patent No. 2,773,864            December 11, 1956

William W. Williams et al.

It is hereby certified that error appears in the printed specification of the above numbered patent requiring correction and that the said Letters Patent should read as corrected below.

Column 2, line 1, before "are by weight," insert -- The following example, wherein parts and percentages --, as the beginning of a new paragraph; column 4, line 31, for "tetrazodized" read -- tetrazotized --.

Signed and sealed this 4th day of April 1961.

(SEAL)
Attest: ERNEST W. SWIDER
Attesting Officer

ARTHUR W. CROCKER
Acting Commissioner of Patents